(12) United States Patent
Kroeger et al.

(10) Patent No.: US 6,898,249 B2
(45) Date of Patent: May 24, 2005

(54) METHOD AND APPARATUS FOR AM DIGITAL AUDIO BROADCASTING WITH AMPLITUDE SCALED TERTIARY SUBCARRIERS

(75) Inventors: Brian William Kroeger, Sykesville, MD (US); Steven Andrew Johnson, Ellicott City, MD (US)

(73) Assignee: iBiquity Digital Corporation, Columbia, MD (US)

( * ) Notice: Subject to any disclaimer, the term of this patent is extended or adjusted under 35 U.S.C. 154(b) by 73 days.

(21) Appl. No.: 10/321,058

(22) Filed: Dec. 17, 2002

(65) Prior Publication Data

US 2004/0114694 A1 Jun. 17, 2004

(51) Int. Cl.[7] ............................................... H04L 27/00
(52) U.S. Cl. ...................... 375/259; 375/265; 375/260; 375/295; 375/316
(58) Field of Search ................................ 375/259, 260, 375/265, 316, 295; 370/482, 343

(56) References Cited

U.S. PATENT DOCUMENTS

| | | | |
|---|---|---|---|
| 5,588,022 A | 12/1996 | Dapper et al. | |
| 5,606,576 A | 2/1997 | Dapper et al. | |
| 5,859,876 A | 1/1999 | Dapper et al. | |
| 5,898,732 A | 4/1999 | Dapper et al. | |
| 5,930,687 A | 7/1999 | Dapper et al. | |
| 6,005,894 A | 12/1999 | Kumar | |
| 6,178,317 B1 | 1/2001 | Kroeger et al. | |
| 6,243,424 B1 | 6/2001 | Kroeger et al. | |
| 6,292,511 B1 | 9/2001 | Goldston et al. | |
| 6,295,317 B1 | 9/2001 | Hartup et al. | |
| 6,351,500 B2 | 2/2002 | Kumar | |
| 6,400,758 B1 | 6/2002 | Goldston et al. | |
| 6,445,750 B1 | 9/2002 | Chen et al. | |
| 6,452,977 B1 * | 9/2002 | Goldston et al. | 375/260 |
| 6,487,256 B2 * | 11/2002 | Kroeger et al. | 375/265 |
| 6,549,544 B1 * | 4/2003 | Kroeger et al. | 370/482 |
| 2001/0024475 A1 | 9/2001 | Kumar | |
| 2004/0022229 A1 * | 2/2004 | Vanness | |

OTHER PUBLICATIONS

"System for Digital Sound Broadcasting in the Broadcasting Bands Below 30 MHz," Draft New Recommendation ITU–R BS, International Telecommunication Union, Radio-communication Study Groups, Oct. 25, 2000, pp. 1–30.

IBOC AM Transmission Specification, Nov. 2001, pp. 1–28.

* cited by examiner

Primary Examiner—Shuwang Liu
Assistant Examiner—Eva Zheng
(74) Attorney, Agent, or Firm—Robert P. Lenart, Esq.; Pietragallo Bosick & Gordon

(57) ABSTRACT

A method of in-band on-channel (IBOC) digital audio broadcasting (DAB) comprises the steps of providing an analog modulated carrier signal in a central frequency band of an AM radio channel, providing a first plurality of subcarriers in an upper sideband of the AM radio channel, providing a second plurality of subcarriers in a lower sideband of the AM radio channel, providing a third plurality of subcarriers in the central frequency band of the AM radio channel, modulating the first, second and third plurality of subcarriers with one or more digitally encoded signals, and transmitting the analog modulated signal and the first, second and third plurality of subcarriers, wherein the subcarriers in the third plurality of subcarriers that are positioned closest to the center of the channel are transmitted at higher power spectral densities than the subcarriers in the third plurality of subcarriers that are positioned farther from the center of the channel. The power spectral densities of a first group of the subcarriers in the third plurality of subcarriers can decrease linearly with frequency separation from the center of the channel. Transmitters and receivers that utilize the composite IBOC DAB signal are also included.

10 Claims, 2 Drawing Sheets

METHOD AND APPARATUS FOR AM DIGITAL AUDIO BROADCASTING WITH AMPLITUDE SCALED TERTIARY SUBCARRIERS

BACKGROUND OF THE INVENTION

This invention relates to radio broadcasting, and more particularly, to modulation formats for use in AM In-Band On-Channel (IBOC) Digital Audio Broadcasting (DAB), and transmitters and receivers that utilize such modulation formats.

Digital Audio Broadcasting is a medium for providing digital-quality audio, superior to that provided by existing analog broadcasting formats. AM IBOC DAB can be transmitted in a hybrid format where it coexists with the AM signal, or in an all-digital format where the removal of the analog signal enables improved digital coverage with reduced interference. AM IBOC DAB requires no new spectral allocations because each DAB signal is simultaneously transmitted within the spectral mask of an existing AM channel allocation. IBOC DAB promotes economy of spectrum while enabling broadcasters to supply digital quality audio to their present base of listeners.

U.S. Pat. No. 5,588,022 discloses a hybrid AM IBOC broadcasting modulation format for simultaneously broadcasting analog and digital signals in a standard AM broadcasting channel that includes an amplitude modulated radio frequency signal having a first frequency spectrum, wherein the amplitude modulated radio frequency signal includes a first carrier modulated by an analog program signal, and a plurality of digitally modulated carrier signals within a bandwidth which encompasses the first frequency spectrum, with the digitally modulated carrier signals being modulated by a digital program signal. A first group of the digitally modulated carrier signals lying within the first frequency spectrum is modulated in-quadrature with the first carrier signal, and second and third groups of the digitally modulated carrier signals lying outside of the first frequency spectrum are modulated both in-phase and in-quadrature with the first carrier signal.

U.S. Pat. No. 6,243,424 discloses a method for AM IBOC DAB that uses a center channel signal in a central frequency band of an AM radio channel, wherein the center channel signal includes a carrier which is analog modulated by the first version of the program material and subcarriers modulated by a second version of the program material. Subcarriers in upper and lower sidebands of the AM radio channel are modulated with additional digitally encoded portions of the program material.

The digital signal in AM IBOC DAB systems is modulated using orthogonal frequency division multiplexing (OFDM). OFDM is a parallel modulation scheme in which the data stream modulates a large number of orthogonal subcarriers that are transmitted simultaneously. OFDM is inherently flexible, readily allowing the mapping of logical channels to different groups of subcarriers.

This invention seeks to improve the performance of hybrid AM IBOC DAB systems.

SUMMARY OF THE INVENTION

This invention provides a method of in-band on-channel digital audio broadcasting comprising the steps of providing an analog modulated carrier signal in a central frequency band of an AM radio channel, providing a first plurality of subcarriers in an upper sideband of the AM radio channel, providing a second plurality of subcarriers in a lower sideband of the AM radio channel, providing a third plurality of subcarriers in the central frequency band of the AM radio channel, modulating the first, second and third plurality of subcarriers with one or more digitally encoded signals, and transmitting the analog modulated signal and the first, second and third plurality of subcarriers, wherein the subcarriers in the third plurality of subcarriers that are positioned closest to the center of the channel are transmitted at higher power spectral densities than the subcarriers in the third plurality of subcarriers that are positioned farther from the center of the channel. The power spectral densities of a first group of the subcarriers in the third plurality of subcarriers can decrease linearly with frequency separation from the center of the channel.

The invention also encompasses transmitters for broadcasting in-band on-channel digital audio signals, comprising an analog modulator for analog modulating a carrier signal in a central frequency band of an AM radio channel, a digital modulator for digitally modulating a first plurality of subcarriers in an upper sideband of the AM radio channel, a second plurality of subcarriers in a lower sideband of the AM radio channel, and a third plurality of subcarriers in the central frequency band of the AM radio channel, and an antenna for transmitting the analog modulated signal and the first, second and third plurality of subcarriers, wherein the subcarriers in the third plurality of subcarriers that are positioned closest to the center of the channel are transmitted at higher power spectral densities than the subcarriers in the third plurality of subcarriers that are positioned farther from the center of the channel.

The invention further encompasses receivers for receiving in-band on-channel digital audio signals, comprising an antenna for receiving an analog modulated carrier signal in a central frequency band of an AM radio channel, a first plurality of digitally modulated subcarriers in an upper sideband of the AM radio channel, a second plurality of digitally modulated subcarriers in a lower sideband of the AM radio channel, and a third plurality of digitally modulated subcarriers in the central frequency band of the AM radio channel, wherein the subcarriers in the third plurality of subcarriers that are positioned closest to the center of the channel have higher power spectral densities than the subcarriers in the third plurality of subcarriers that are positioned farther from the center of the channel, a first demodulator for demodulating the analog modulated carrier signal to produce a demodulated analog signal, a second demodulator for demodulating a first, second and third pluralities of digitally modulated subcarriers to produce a demodulated digital signal, and a speaker for producing an output representative of the analog signal and/or the digital signal.

DESCRIPTION OF THE PREFERRED EMBODIMENTS

Figure 1:
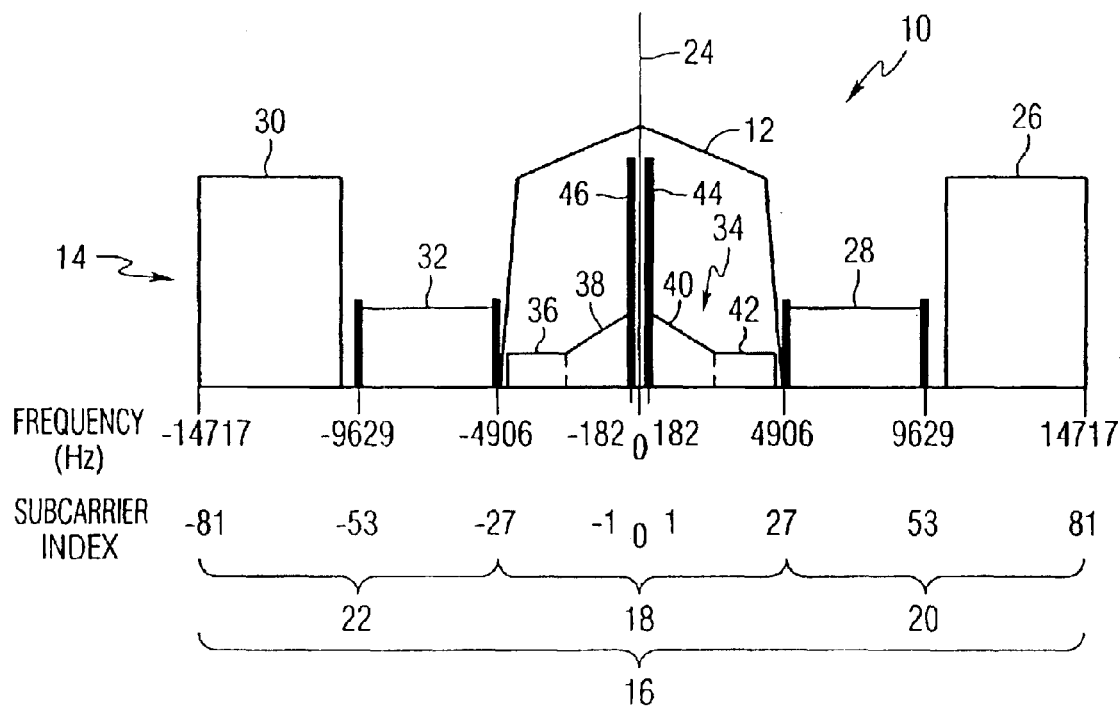
FIG. 1 is a schematic representation of an AM hybrid IBOC DAB spectrum used in one embodiment of the invention, showing relative levels of AM and DAB signals.

Referring to the drawings, FIG. 1 is a schematic representation of an AM hybrid IBOC waveform 10 used in one embodiment of the invention. The hybrid format includes the conventional AM analog signal 12 (bandlimited to about ±5 kHz) along with a nearly 30 kHz wide DAB signal 14 transmitted beneath the AM signal. The spectrum is contained within a channel 16 having a bandwidth of about 30.kHz. The channel is divided into a central frequency band 18, and upper 20 and lower 22 frequency bands. The central frequency band is about 10 kHz wide and encompasses frequencies lying within about ±5 kHz of the center frequency $f_o$ of the channel. The upper sideband extends from about +5 kHz from the center frequency to about +15 kHz from the center frequency. The lower sideband extends from about −5 kHz from the center frequency to about −15 kHz from the center frequency.

The AM hybrid IBOC DAB signal format in one embodiment of the invention comprises the analog modulated carrier signal 24 plus 162 OFDM subcarrier locations spaced at approximately 181.7 Hz, spanning the central frequency band and the upper and lower sidebands. Coded digital information representative of the audio or data signals to be transmitted (program material), is transmitted on the subcarriers. The symbol rate is less than the subcarrier spacing due to a guard time between symbols.

As shown in FIG. 1, the upper sideband is divided into a primary section 26 and a secondary section 28, and the lower sideband is divided into a primary section 30 and a secondary section 32. The digital signals are transmitted in primary and secondary sidebands on either side of the host analog signal, as well as underneath the host analog signal in a tertiary sideband 34. For the purpose of this explanation, the tertiary sideband 34 can be considered to include a plurality of groups of subcarriers labeled 36, 38, 40 and 42 in FIG. 1. Subcarriers within the tertiary sideband that are positioned near the center of the channel are referred to as inner subcarriers and subcarriers within the tertiary sideband that are positioned farther from the center of the channel are referred to as outer subcarriers. In this example, the power level of the inner subcarriers in groups 38 and 40 is shown to decrease linearly with frequency spacing from the center frequency. The remaining groups of subcarriers 36 and 42 in the tertiary sideband have substantially constant power levels.

FIG. 1 also shows two reference subcarriers 44 and 46 for system control whose levels are fixed at a value that is different from the other sidebands.

The center carrier 24, at frequency $f_o$, is not QAM modulated, but carries the main AM carrier plus a synchronization signal modulated in quadrature to the carrier. The remaining subcarriers positioned at locations designated as 2 through 26 and −2 through −26 on either side of the AM carrier are modulated with 32-QAM. Representative subcarrier locations are identified by the subcarrier index shown in FIG. 1. Subcarriers at locations 2 through 26 and −2 through −26 on either side of the central frequency, are referred to as tertiary subcarriers and are transmitted in complementary pairs such that the modulated resultant DAB signal is in quadrature to the analog modulated AM signal. The use of complementary subcarrier pairs in an AM IBOC DAB system is shown in U.S. Pat. No. 5,859,876.

The hybrid IBOC DAB waveform is divided into several sidebands, which represent various subcarrier groupings. The center frequency of each subcarrier is calculated by multiplying the subcarrier number by the OFDM subcarrier spacing $D_f$. The center of the analog modulated carrier is located at 0 Hz. In this context, the center frequency is the center of the allocated radio frequency (RF) channel.

The power of subcarriers in the digital sidebands is significantly below the total power in the analog AM signal. The level of each OFDM subcarrier within a given primary or secondary sideband is fixed at a constant value. Primary or secondary sidebands may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Subcarriers 57 and 81, whose center frequencies are located at 10356.1 Hz and 14716.6 Hz, respectively, bound the primary upper sideband of the Hybrid waveform. Thus, the frequency span of the primary upper sideband is 4360.5 Hz.

Table 1 summarizes the spectral characteristics of the hybrid IBOC DAB waveform. Individual subcarriers are numbered from −81 to 81 with the center carrier at subcarrier number 0. Table 1 lists the approximate frequency ranges and bandwidths for each sideband. In Table 1, the subcarriers 54 to 56 and −54 to −56 are not represented. This is because they are not transmitted to avoid interference with first adjacent signals.

TABLE 1

AM Hybrid Waveform Spectral Summary

| Sideband | Subcarrier Range | Subcarrier Frequencies (Hz from channel center) | Frequency Span (Hz) |
| --- | --- | --- | --- |
| Primary Upper | 57 to 81 | 10356.1 to 14716.6 | 4360.5 |
| Primary Lower | −57 to −81 | −10356.1 to −14716.6 | 4360.5 |
| Secondary Upper | 28 to 52 | 5087.2 to 9447.7 | |
| Secondary Lower | −28 to −52 | −5087.2 to −9447.7 | 4360.5 |
| Tertiary Upper | 2 to 26 | 363.4 to 4723.8 | 4360.4 |
| Tertiary Lower | −2 to −26 | −363.4 to −4723.8 | 4360.4 |
| Reference Upper | 1 | 181.7 | 181.7 |
| Reference Lower | −1 | −181.7 | 181.7 |
| IDS1 | 27 | 4905.5 | 181.7 |
| IDS2 | 53 | 9629.4 | 181.7 |
| IDS1* | −27 | −4905.5 | 181.7 |
| IDS2* | −53 | −9629.4 | 181.7 |

The subcarriers can be multiplied by amplitude scale factors to scale the individual subcarriers to the proper levels relative to the unmodulated main carrier. In Table 1, the IDS subcarriers are subcarriers used to transmit an in-band on-channel data service.

In the tertiary sideband, the OFDM subcarrier power levels may be adjusted. In accordance with this invention, subcarriers in the tertiary sideband that are closer to the center frequency have a higher power level than subcarriers in the tertiary sideband that are farther from the center frequency.

Scaling the tertiary subcarriers in this manner reduces the adverse affect of phase noise spread from the main carrier over the inner tertiary region. The main subcarrier is transmitted at 0 dBc (reference) while the outer tertiary subcarriers are nominally −50 dBc. Phase noise is imposed upon the main carrier through the local oscillators in the transmitter and receiver. Although the phase noise is relatively small in the transmitter, the phase noise in the receiver can be significant. Phase noise from a phase-locked-loop PLL circuit controlling the local oscillator is of primary concern where the phase noise is typically multiplied from a 10 kHz reference (the AM channel spacing) to the final radio frequency in the 1 MHz region. This is a phase noise increase by a factor of about 100, or 40 dB. Although a good phase locked loop design is required in the receiver to maintain low phase noise, it is desirable to set the required phase noise levels sufficiently large to permit cost effective implementation with commercially available components. If the tertiary subcarrier levels near the main carrier were left at −50 dB, this would result in either significant degradation of these signals, or the requirement for better devices, which would increase cost. The alternative of raising the inner tertiary subcarrier levels sufficiently above the phase noise is a better solution.

It should be recognized that the tertiary subcarrier levels are originally set very small at −50 dBc in quadrature to the host analog signal in order to minimize the crosstalk interference to the host analog AM signal. The crosstalk from the tertiary subcarriers is due to two effects: first, the envelope detection in the receiver is distorted by the relatively small quadrature tertiary signal component over the audio bandwidth. The fact that the tertiary component of the AM detection is in quadrature substantially reduces the crosstalk. However, the tertiary signal is not in perfect quadrature due to intermediate frequency filter asymmetry between the upper and lower sidebands. The asymmetry is not usually significant over narrow bandwidths close to the main carrier (that is, at the center of the filter). The asymmetry becomes more problematic further from the main carrier, especially several kHz away from the main carrier. For this reason, the phase noise in the outer tertiary subcarrier dominates the crosstalk problem if all tertiary subcarriers were at the same level. Raising the power of the inner tertiary subcarriers makes the crosstalk effects more balanced over all tertiary subcarriers. This has the additional benefit of a higher SNR for the inner tertiary subcarriers against the background noise and interference, increasing signal robustness without significantly compromising host analog crosstalk compatibility. Furthermore, the increased inner tertiary subcarrier power can be effectively mitigated by using analog precompensation for envelope detectors in the receivers. Precompensation is most effective for inner tertiary subcarriers (as opposed to outer tertiary subcarriers) due to the filter asymmetry issues described above. Therefore the inner tertiary subcarriers can be increased in power without significant adverse effects.

Figure 2:
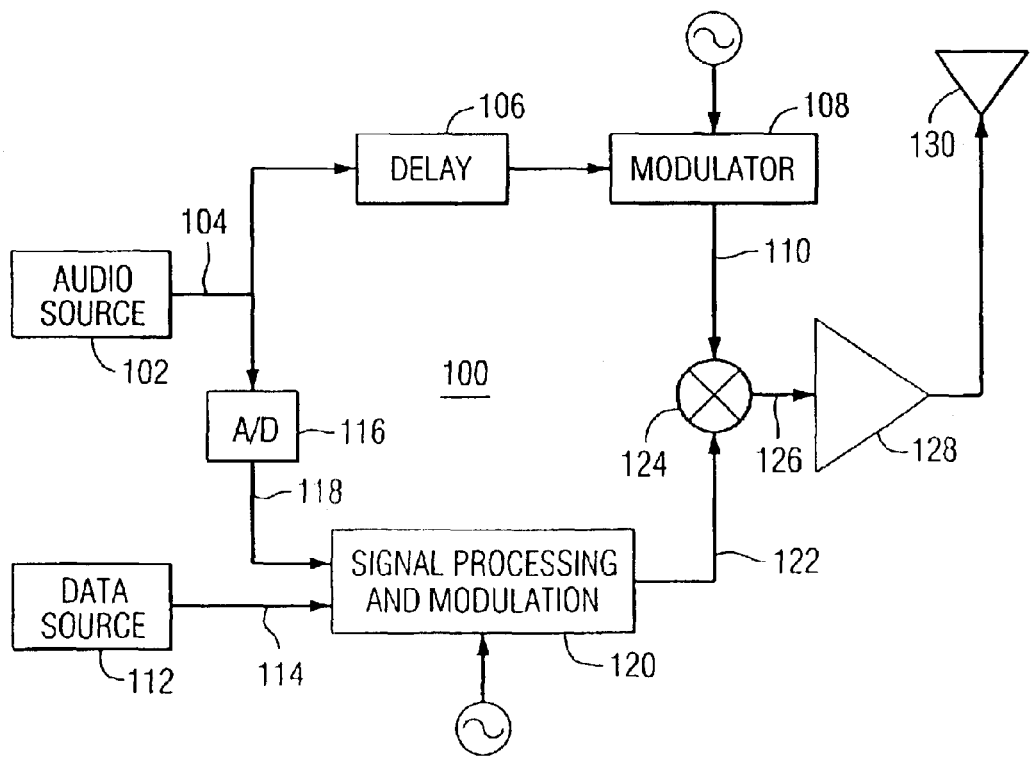
FIG. 2 is a simplified functional block diagram of an AM IBOC DAB transmitter that can broadcast the waveform of FIG. 1.

FIG. 2 is a simplified functional block diagram of an AM IBOC DAB transmitter 100 that can broadcast the waveform of FIG. 1. An audio source 102 provides an analog audio signal representative of program material to the transmitter on line 104. The analog signal is delayed as indicated by block 106 and modulated by modulator 108 to produce the analog modulated signal component of FIG. 1 on line 110. A data source 112 provides a digital signal on line 114 representative of additional information to be transmitted. An analog to digital converter 116 converts the analog audio signal to a digital signal on line 118. The digital signals on lines 114 and 118 are processed and modulated as illustrated by block 120 to produce the OFDM subcarriers of FIG. 1 on line 122. The signal processing represented by block 120 would typically include forward error correction, interleaving, and framing. Combiner 124 combines the analog modulated signal component and the OFDM subcarriers to produce the composite waveform of FIG. 1 on line 126, which is amplified by amplifier 128 and transmitted by antenna 130.

Figure 3:
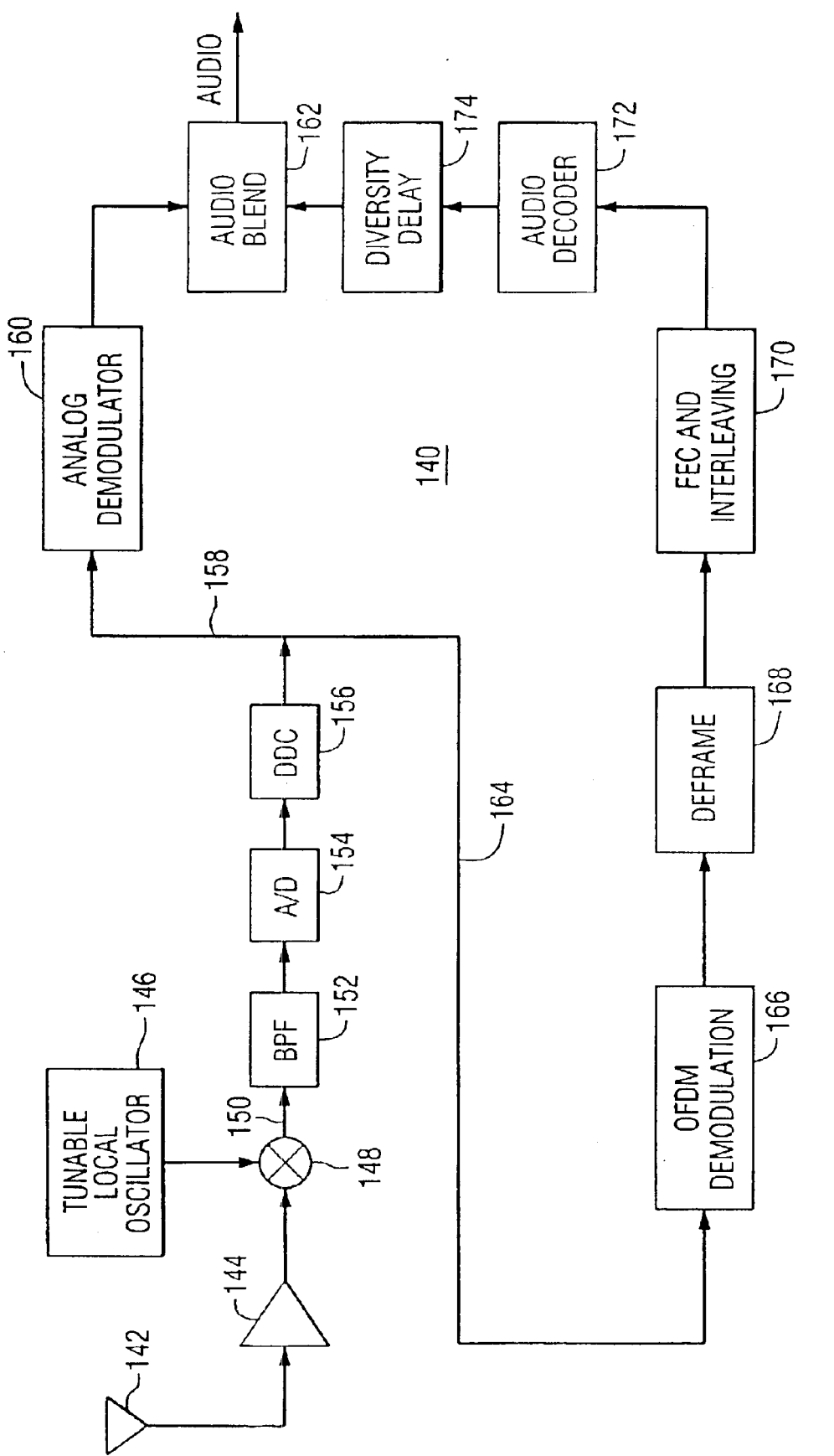
FIG. 3 is a simplified functional block diagram of an AM IBOC DAB receiver that can receive the waveform of FIG. 1.

FIG. 3 is a simplified functional block diagram of an AM IBOC DAB receiver 140 that can receive the waveform of FIG. 1. Receiver 140 receives the composite signal at antenna 142. The signal received by antenna 142 is coupled to the front end amplifier/tuning circuits 144. Local oscillator 146 and mixer 148 convert the composite signal to an intermediate frequency signal on line 150 which is filtered by bandpass filter 152 and converted to a digital signal by analog to digital converter 154. A digital down converter 156 converts the signal to baseband for further processing. The sampled analog signal on line 158 is demodulated by analog demodulator 160 and sent to a blend circuit 162. The digital signal on line 164 is demodulated by demodulator 166, deframed by deframer 168, and delinterleaved by delinterleaver 170. Decoder 172 decodes the digital signal, which is then delayed as shown by block 174 before being sent to blend circuit 162. Blend circuit produces an audio output signal which can be used to produce an audible output. Blending in an IBOC DAB system is disclosed in U.S. Pat. No. 6,178,317. A separate output can be provided for data that has been transmitted by the IBOC DAB composite signal.

Using the modulation format of FIG. 1, the analog modulated carrier and all digitally modulated subcarriers are transmitted within the channel mask specified for standard AM broadcasting in the United States. The hybrid system uses the analog AM signal for tuning and backup.

While the present invention has been described in terms of what are at present believed to be its preferred embodiments, it should be understood that various changes can be made without departing from the scope of the invention as defined by the claims.

What is claimed is:

1. A method of in-band on-channel digital audio broadcasting comprising the steps of:

providing an analog modulated carrier signal in a central frequency band of an AM radio channel;

providing a first plurality of subcarriers in an upper sideband of the AM radio channel;

providing a second plurality of subcarriers in a lower sideband of the AM radio channel;

providing a third plurality of subcarriers in the central frequency band of the AM radio channel;

modulating the first, second and third plurality of subcarriers with one or more digitally encoded signals; and transmitting the analog modulated signal and the first, second and third plurality of subcarriers;

wherein the subcarriers in the third plurality of subcarriers that are positioned closest to the center of the channel are transmitted at higher power spectral densities than the subcarriers in the third plurality of subcarriers that are positioned farther from the center of the channel, and wherein the power spectral densities of a first group of the subcarriers in the third plurality of subcarriers decrease linearly with frequency separation from the center of the channel.

2. The method of claim 1, wherein the power spectral densities of second and third groups of the subcarriers in the third plurality of subcarriers are substantially constant.

3. A transmitter for broadcasting in-band on-channel digital audio signals, the transmitter comprising:

means for analog modulating a carrier signal in a central frequency band of an AM radio channel;

means for digitally modulating a first plurality of subcarriers in an upper sideband of the AM radio channel, a second plurality of subcarriers in a lower sideband of the AM radio channel, and a third plurality of subcarriers in the central frequency band of the AM radio channel; and an antenna for transmitting the analog modulated signal and the first, second and third plurality of subcarriers;

wherein the subcarriers in the third plurality of subcarriers that are positioned closest to the center of the channel are transmitted at higher power spectral densities than the subcarriers in the third plurality of subcarriers that are positioned farther from the center of the channel, and wherein the power spectral densities of a first group of the subcarriers in the third plurality of subcarriers decrease linearly with frequency separation from the center of the channel.

4. The transmitter of claim 3, wherein the power spectral densities of second and third groups of the subcarriers in the third plurality of subcarriers are substantially constant.

5. A transmitter for broadcasting in-band on-channel digital audio signals, the transmitter comprising:

an analog modulator for analog modulating a carrier signal in a central frequency band of an AM radio channel;

a digital modulator for digitally modulating a first plurality of subcarriers in an upper sideband of the AM radio channel, a second plurality of subcarriers in a lower sideband of the AM radio channel, and a third plurality of subcarriers in the central frequency band of the AM radio channel; and an antenna for transmitting the analog modulated signal and the first, second and third plurality of subcarriers;

wherein the subcarriers in the third plurality of subcarriers that are positioned closest to the center of the channel are transmitted at higher power spectral densities than the subcarriers in the third plurality of subcarriers that are positioned farther from the center of the channel, and wherein the power spectral densities of a first group of the subcarriers in the third plurality of subcarriers decrease linearly with frequency separation from the center of the channel.

6. The transmitter of claim 5, wherein the power spectral densities of second and third groups of the subcarriers in the third plurality of subcarriers are substantially constant.

7. A receiver for receiving in-band on-channel digital audio signals, the receiver comprising:

means for receiving an analog modulated carrier signal in a central frequency band of an AM radio channel, a first plurality of digitally modulated subcarriers in an upper sideband of the AM radio channel, a second plurality of digitally modulated subcarriers in a lower sideband of the AM radio channel, and a third plurality of digitally modulated subcarriers in the central frequency band of the AM radio channel, wherein the subcarriers in the third plurality of subcarriers that are positioned closest to the center of the channel have higher power spectral densities than the subcarriers in the third plurality of subcarriers that are positioned farther from the center of the channel, and wherein the power spectral densities of a first group of the subcarriers in the third plurality of subcarriers decrease linearly with frequency separation from the center of the channel;

means for demodulating the analog modulated carrier signal to produce a demodulated analog signal;

means for demodulating the first, second and third pluralities of digitally modulated subcarriers to produce a demodulated digital signal; and means for producing an output representative of the analog signal and/or the digital signal.

8. The receiver of claim 7, wherein the power spectral densities of second and third groups of the subcarriers in the third plurality of subcarriers are substantially constant.

9. A receiver for receiving in-band on-channel digital audio signals, the receiver comprising:

an antenna for receiving an analog modulated carrier signal in a central frequency band of an AM radio channel, a first plurality of digitally modulated subcarriers in an upper sideband of the AM radio channel, a second plurality of digitally modulated subcarriers in a lower sideband of the AM radio channel, and a third plurality of digitally modulated subcarriers in the central frequency band of the AM radio channel, wherein the subcarriers in the third plurality of subcarriers that are positioned closest to the center of the channel have higher power spectral densities than the subcarriers in the third plurality of subcarriers that are positioned farther from the center of the channel, and wherein the power spectral densities of a first group of the subcarriers in the third plurality of subcarriers decrease linearly with frequency separation from the center of the channel;

a first demodulator for demodulating the analog modulated carrier signal to produce a demodulated analog signal;

a second demodulator for demodulating the first, second and third pluralities of digitally modulated subcarriers to produce a demodulated digital signal; and a speaker for producing an output representative of the analog signal and/or the digital signal.

10. The receiver of claim 9, wherein the power spectral densities of second and third groups of the subcarriers in the third plurality of subcarriers are substantially constant.

\* \* \* \* \*

UNITED STATES PATENT AND TRADEMARK OFFICE
CERTIFICATE OF CORRECTION

PATENT NO. : 6,898,249 B2 Page 1 of 1
APPLICATION NO. : 10/321,058
DATED : May 24, 2005
INVENTOR(S) : Brian William Kroeger and Steven Andrew Johnson It is certified that error appears in the above-identified patent and that said Letters Patent is hereby corrected as shown below:

TABLE 1,
Column 4, Line 40
"Frequency Span (Hz)" Column, insert -- 4360.5 --

Signed and Sealed this

Twenty-ninth Day of August, 2006

JON W. DUDAS
*Director of the United States Patent and Trademark Office*